United States Patent
Goebels et al.

(10) Patent No.: US 7,020,551 B2
(45) Date of Patent: Mar. 28, 2006

(54) ROLL STABILITY CONTROL SYSTEM

(75) Inventors: Hermann J. Goebels, Sheffield Village, OH (US); Richard E. Beyer, Westlake, OH (US); Christopher M. Knaack, Bay Village, OH (US); William P. Amato, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 98 days.

(21) Appl. No.: 10/745,126

(22) Filed: Dec. 23, 2003

(65) Prior Publication Data

US 2005/0137767 A1 Jun. 23, 2005

(51) Int. Cl.
*B60T 8/32* (2006.01)
*B60T 13/74* (2006.01)

(52) U.S. Cl. .............. 701/38; 701/83; 701/91; 303/118.1; 303/113.2; 280/5.502

(58) Field of Classification Search .............. 701/38, 701/83, 91, 71, 72; 303/113.1, 113.2, 116.1, 303/116.2, 118.1, 119.1, 119.2, 3; 280/5.502, 280/5.507

See application file for complete search history.

(56) References Cited

U.S. PATENT DOCUMENTS

| | | | | |
|---|---|---|---|---|
| 5,004,299 A | * | 4/1991 | Brearley et al. | 303/15 |
| 5,171,069 A | * | 12/1992 | Peck et al. | 303/127 |
| 5,462,342 A | | 10/1995 | Goebels | |
| 5,575,543 A | * | 11/1996 | Pheonix | 303/155 |
| 5,718,486 A | * | 2/1998 | Vollmer et al. | 303/3 |
| 6,010,198 A | * | 1/2000 | Nakazawa | 303/113.1 |
| 6,081,761 A | * | 6/2000 | Harada et al. | 701/72 |
| 6,176,555 B1 | | 1/2001 | Semsey | |
| 6,371,573 B1 | | 4/2002 | Goebels et al. | |
| 6,443,540 B1 | * | 9/2002 | Shimizu et al. | 303/177 |
| 6,553,284 B1 | | 4/2003 | Holst et al. | |
| 6,741,922 B1 | * | 5/2004 | Holler | 701/71 |
| 6,880,899 B1 | * | 4/2005 | Soejima et al. | 303/146 |
| 2002/0099488 A1 | | 7/2002 | Brachert | |

FOREIGN PATENT DOCUMENTS

DE 101 29 605 1/2003
DE 101 49 918 C1 5/2003

(Continued)

OTHER PUBLICATIONS

International Search Report from PCT/US2005/017191.
International Search Report from PCT/US2004/043210.

*Primary Examiner*—Tan Q. Nguyen
(74) *Attorney, Agent, or Firm*—Calfee, Halter & Griswold LLP

(57) ABSTRACT

A roll stability control system for a pneumatically operated vehicle brake system is implemented using simpler ABS hardware rather than more complex EBS hardware. For each brake chamber or channel, two 3/2 solenoid controlled valves are used. An ECU is operative to control the solenoids. The ECU is preferably operative to provide a selected delivery pressure to the brake chamber without measurement of delivery pressure to the brake chamber. Supply air is provided at a known pressure to a first solenoid controlled valve that is associated with the brake chamber; the amount of time of energization and de-energization of the first valve that is needed to provide an output therefrom of a given pressure, is calculated; and the first valve is energized and de-energized for the calculated times, thereby to cause a low-pressure test pulse to be provided to the brake chamber.

35 Claims, 6 Drawing Sheets

FOREIGN PATENT DOCUMENTS

| | | |
|---|---|---|
| EP | 0 226 803 | 7/1987 |
| EP | 0 816 195 B1 | 4/1997 |
| GB | 2 270 130 A | 3/1994 |
| WO | WO 01/10692 | 2/2001 |
| WO | WO 01/96159 A1 | 12/2001 |
| WO | WO 03/033321 A1 | 4/2003 |

\* cited by examiner

ROLL STABILITY CONTROL SYSTEM

TECHNICAL FIELD

The present invention relates to an enhanced antilock brake system and, more particularly, to a roll stability control system for use in a pneumatically operated vehicle brake system. The roll stability control system is implemented using simpler hardware rather than more complex electronic braking system hardware.

BACKGROUND OF THE INVENTION

Roll stability control (RSC) is normally implemented only by means of an electronically controlled braking system (EBS). EBS involves the electronic control of an air brake system using electronic signals to allow air into the brake chambers to operate the brake system. EBS provides the platform for a variety of vehicle control features. RSC is used to prevent rollover accidents. RSC prevents overturning of a vehicle about the longitudinal axis, the most common rollover situation. RSC can be a part of a tractor EBS as well as a part of a trailer EBS.

In a normal braking system or in an Antilock Braking System (ABS), the brake pressure is mechanically provided by the driver operated brake valve. With EBS, the brake pressure is electronically controlled. Therefore, the EBS must be able to apply and release brake pressure by means of electrically operated solenoids. EBS requires the use of ABS wheel speed sensors (WSS) at each wheel, and also pressure modulator relay valves (MRV). The solenoids and valves of an EBS system are used for every braking operation of the vehicle, including service braking, and therefore must be very robust—more so than ABS hardware, which is used only in an ABS event, which is relatively rare.

RSC requires additional components beyond the EBS components as described above. For example, an EBS based RSC in a trailer requires more sensors in addition to the ABS wheel speed sensors and pressure modulator relay valves. These additional sensors may include a lateral acceleration sensor, a suspension air bag sensor, a pressure sensor on the control pressure side and a pressure sensor on the delivery side of each control channel.

On the brake pressure control side, RSC requires a modulator valve that is electrically activated to apply, hold and release pressure to an individual brake chamber independent from the normal braking situation. This 3-stage pressure control typically can be achieved only with 3 solenoids for each channel of the pilot controlled relay valves. These solenoids include a back-up solenoid for switching from mechanical to electrical braking, a hold solenoid for pressure hold and build up, and a release solenoid to vent the brake pressure to the relay exhaust.

The number of pressure sensors for EBS-based RSC for use in a trailer thus reaches 5. In addition, a lateral acceleration sensor is needed for measuring the actual lateral force. FIG. 9 shows an example of one type of EBS system used for implementing RSC. A main component of EBS is the pressure modulator relay valve (MRV), designed in one or in a two-channel version (as shown in FIG. 9). The 2-channel control modulator consists of 6 solenoids, 5 pressure sensors, 2 relay valves and an ECU. The 2 back up solenoids control the control pressure lines. The 2 hold solenoids control pressure hold and build. The 2 release solenoids control pressure release. The ECU is mounted on top of the modulator and includes data processing and control. All solenoids are 2/2 design, meaning 2 pneumatic lines controlled with two armature positions.

By processing the actual data as measured from the various sensors and the ECU's internal built vehicle reference speed, the ECU automatically evaluates the potential danger of overturning. If a potential for overturning is indicated, the ECU provides a braking test pulse with a low-pressure value to the curve inside wheels to identify the actual roll over tendency. If the danger of overturning is real, the ECU activates hard braking to the curve outside wheels and reduces the risk for overturning by reducing the vehicle's speed.

While the hard braking procedure is typically a full braking apply to the curve outside wheel, the test pulse to the curve inside wheels is a more sensitive operation. The real potential for overturning is only recognizable if the curve inside wheel slows in a predetermined characteristic manner when a relatively low and accurate pressure test pulse is applied. Only by using pressure sensors connected to the output delivery lines can the EBS assure the necessary accuracy of the actual brake pressure during normal braking and during the test pulse in a roll stability event.

To achieve the desired brake pressure value accuracy, the EBS as installed in a trailer needs 5 pressure sensors and 6 solenoids to provide the multiple functions of normal braking, ABS braking, and roll stability control.

SUMMARY OF THE INVENTION

The present invention relates to a vehicle braking system for providing roll stability control, and to methods used in such a system. In one embodiment, the system includes a brake chamber associated with a vehicle wheel to be braked. An air-pressure controlled relay valve provides air pressure to the brake chamber. A solenoid controlled pilot valve controls flow of control air to the relay valve. A solenoid-controlled supply pressure valve is operative to direct either supply pressure or driver control pressure to the pilot valve as control air for the relay valve. An ECU is operative to control the solenoids on the supply pressure valve and the pilot valve. The systems also includes sensors for sensing vehicle conditions that can be used in a determination of whether to initiate roll stability control. The ECU is preferably operative to provide a selected delivery pressure to the brake chamber without measurement of delivery pressure to the brake chamber.

The invention also relates to a method of controlling vehicle roll stability by applying air pressure to a brake chamber associated with a vehicle wheel. The methods includes the steps of providing supply air at a known pressure to a first solenoid controlled valve that is associated with the brake chamber; calculating the amount of time of energization and de-energization of the first valve that is needed to provide an output of a given pressure; and energizing and de-energizing the first valve for the calculated times, thereby to cause a low-pressure test pulse to be provided to the brake chamber.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
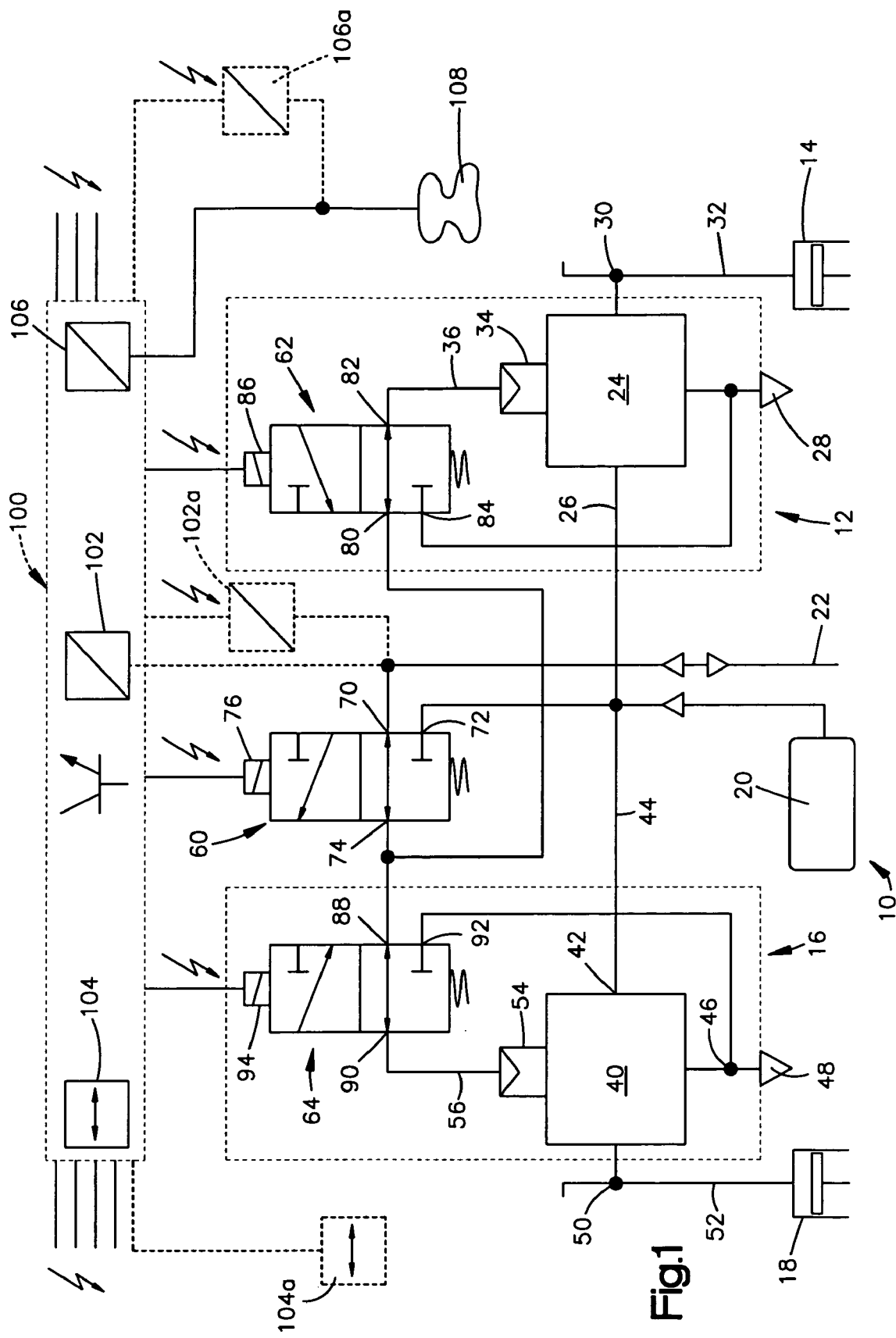
FIG. 1 is a schematic illustration of an ABS-based modular RSC system constructed in accordance with a first embodiment of the invention.

The present invention relates to an enhanced antilock brake system (ABS) and, more particularly, to a roll stability control (RSC) system for use in a pneumatically operated vehicle brake system. The invention is applicable to various roll stability control systems of differing constructions. As representative of the invention, FIG. 1 illustrates schematically a system 10 constructed in accordance with a first embodiment of the invention.

The system 10 is a portion of a two-channel vehicle braking system with ABS and RSC capabilities. The RSC capability is built off the underlying ABS capability, which is described first below. One channel 12 of the system 10 controls a first brake chamber 14—for example, a brake chamber associated with a right wheel on an axle. The other channel 16 controls a second brake chamber 18—for example, a brake chamber associated with a left wheel on an axle.

The system 10 is provided with supply air from an air supply which, in the illustrated embodiment, is an air tank or reservoir 20. The supply air 20 is provided at a predetermined, relatively high and relatively constant, pressure, typically in the range of from about 100 psi to about 120 psi. The system 10 also includes a driver control pressure source for both channels which, in the illustrated embodiment, is the plumbing connection 22 (not shown) to the brake pedal valve of the vehicle.

The first channel 12 includes a relay valve 24. The relay valve 24 has an inlet port connected by a line 26 with the supply air source 20. The relay valve 24 has an exhaust port connected internally within the valve with the exhaust 28.

The relay valve 24 has a delivery port 30 that is connected by a delivery line 32 to the brake chamber 14 that is controlled by the first channel 12. The relay valve 24 also has a control port 34 supplied by an air line 36 for receiving a control signal in the form of pressurized air, for controlling operation of the relay valve. The relay valve 24 is of the known type in which varying the pressure of the air at the control port 34 results in varying the pressure of the air at the delivery port 30.

The second channel 16 of the system 10 is similar to the first channel 12. The second channel 16 includes a relay valve 40 that is identical to the relay valve 24 of the first channel 12. The relay valve 40 has an inlet port 42 connected by a line 44 with the supply air source 20. The relay valve 40 has an exhaust port 46 connected internally within the valve with the exhaust 48.

The relay valve 40 has a delivery port 50 that is connected by a delivery line 52 to the brake chamber 18 that is controlled by the second channel 16. The relay valve 40 also has a control port 54 for receiving over an air line 56 a control signal in the form of pressurized air, for controlling operation of the relay valve. The relay valve 40 is of the known type in which varying the pressure of the air at the control port 54 results in varying the pressure of the air at the delivery port 50.

The system 10 also includes three solenoid controlled valves 60, 62 and 64 for controlling the pressure of the air that is applied to the control ports of the relay valves 24 and 40. All of the three solenoid controlled valves 60–64 are of the same 3/2 design, which means that each solenoid controls 3 pneumatic connections within two armature positions as an electrically operated 2-way valve. The three valves 60–64 include a supply pressure valve 60 and two pilot valves 62 and 64. The two pilot valves 62 and 64 are associated one with each channel 12 or 16, respectively; the one supply pressure valve 60 is operative simultaneously with both channels 12 and 16.

The supply pressure valve 60 has a first inlet 70 that is connected to the driver control pressure source 22. The supply pressure valve 60 has a second inlet 72 that is connected to the supply air pressure source 20. The supply pressure valve 60 has an outlet port 74. The supply pressure valve 60 includes a solenoid 76 for controlling the position of the supply pressure valve. As described below, depending on the position of the solenoid 76 on the supply pressure valve 60 (energized or de-energized), the outlet port 74 of the supply pressure valve is connected with either the driver control pressure source 22 or the supply air pressure 20.

The first pilot valve 62 has an inlet port 80 that is connected to the outlet port 74 of the supply pressure valve 60. The first pilot valve 62 has an outlet port 82 that is connected to the control port 34 of the relay valve 24. The first pilot valve 62 also has an exhaust port 84 that is connected to exhaust at 28. As described below, depending on the position of the solenoid 86 on the first pilot valve 62, the outlet port 82 of the first pilot valve is connected with either its inlet port 80 or with exhaust 28. As a result, the first relay valve 24 is connected with either the inlet port 80 of the first pilot valve 62 to apply air pressure to the first brake chamber 14, or with exhaust at 28 to release pressure from the first brake chamber.

The second pilot valve 64 is identical in construction and operation to the first pilot valve 62. The second pilot valve 64 has an inlet port 88 that is connected to the outlet port 74 of the supply pressure valve 60. The second pilot valve 64 has an outlet port 90 that is connected to the control port 54 of the second relay valve 40. The second pilot valve 64 also has an exhaust port 92 that is connected to exhaust at 48.

As described below, depending on the position of the solenoid 94 on the second pilot valve 64, the outlet port 90 of the second pilot valve 64 is connected with either its inlet port 88 or with exhaust 48. As a result, the second relay valve 40 is connected with either the inlet port 88 of the second pilot valve 64 to apply pressure to the second brake chamber 18, or with exhaust at 48 to release pressure from the second brake chamber.

The outlet port 74 of the supply pressure valve 60 is connected to the control ports 34 and 54 of the two pilot valves 24 and 40, respectively. As noted above, depending on the position of the solenoid 76 on the supply pressure valve 60, the outlet port 74 of the supply pressure valve is connected with either the driver control pressure source 22 or the supply air pressure 20. Thus, the supply pressure valve 60 is selectively operable to direct either (a) driver control pressure 22 from the brake pedal valve, or (b) supply air 20 from the reservoir, to the inlet ports 80 and 88 of the two pilot valves 62 and 64, respectively. Thus, controlling the position of the supply pressure valve 60, via its solenoid 76, determines whether the two relay valves 24 and 40 receive, as controls, either (a) driver control pressure 22 under the control of the driver, or (b) full supply pressure 20.

The system 10 includes an electronic controller, or ECU, shown schematically at 100. The ECU 100 is connected electrically with the solenoid 76 on the supply pressure valve 60; with the solenoid 86 on the first pilot valve 62; and with the solenoid 94 on the second pilot valve 64. The ECU 100 is operative to control the states, or positions, of the solenoids on the three valves 60–64.

The supply pressure valve 60 is normally in the condition shown in FIG. 1. In this condition, the solenoid 76 is not energized, and the driver control pressure 22 is connected with the outlet port 74 in a flow through manner. As a result, driver demand for service braking causes an appropriate control pressure to be applied through the supply pressure valve 60 to the pilot valves 62 and 64.

The pilot valves 62 and 64, also, are normally in the condition shown in FIG. 1. In this condition, the solenoid 86 of the first pilot valve 62 is not energized, and the inlet port 80 of the first pilot valve is connected with the control port 34 of the first relay valve 24 in a flow through manner. Similarly, the solenoid 94 of the second pilot valve 64 is not energized, and the inlet port 88 of the second pilot valve is connected with the control port 54 of the second relay valve 40 in a flow through manner.

For normal service braking, operation of the first channel 12 is the same as operation of the second channel 16, and so only the operation of the first channel is described. In normal service braking, driver demand as applied to the brake pedal valve results in a driver control pressure 22 that flows through the supply pressure valve 60 and through the first pilot valve 62 to the control port 34 of the first relay valve 24. The pressure of this control air is dependent on the force applied to the brake pedal valve by the driver. The driver control pressure 22 causes the first relay valve 24 to direct supply air from the air tank 20 to delivery 30 and thus to the brake chamber 14. The brake is applied to slow rotation of the associated road wheel, in a known manner.

As to ABS braking, operation of the first channel 12 is the same as operation of the second channel 16, and so only the operation of the first channel is described. Should the road wheel that is controlled by the first brake chamber 14, when being braked, tend to lockup, a wheel speed sensor (not shown) that is associated with the wheel sends an appropriate signal to the ECU 100. The ECU 100 sends an appropriate control signal to the solenoid 86 of the first pilot valve 62. The solenoid 86 on the first pilot valve 62 is energized. When this occurs, the first pilot valve 62 moves to a second condition (as shown in the upper part of the first pilot valve) in which the first pilot valve connects the control port 34 of the first relay valve 24 with exhaust at 28, via the exhaust port 84, rather than with the driver control pressure 22 coming from the foot pedal valve.

This actuation of the first pilot valve 62 effectively vents the brake chamber 14 associated with the over braked road wheel, releasing the brake at the road wheel. When the road wheel speed thereafter begins to recover again at a sufficient speed, the ECU 100 in response to the wheel speed sensor de-energizes the solenoid 86 on the first pilot valve 62, causing it to return to its first condition and allowing braking effect to be provided again at the road wheel. In this manner, the ECU 100 can provide the standard anti-lock braking function of the system 10.

In an ABS event, the two pilot valves 62 and 64, each of which is controlled by only a single solenoid, regulate the control air 22 from the brake valve to the relay valves 24 and 40 individually. By the operating principle of the relay valves 24 and 40, also the brake chamber pressures at 14 and 18 are regulated individually. Each one of the two relay valves 24 and 40 is controlled by a single 3/2-solenoid only.

The system 10 includes additional sensors and software for facilitating performance of a roll stability control function, independently of the ABS function. One of the additional sensors is a driver control pressure sensor shown schematically at 102. The driver control pressure sensor 102 senses driver control pressure upstream of the supply pressure valve 60. The output of the driver control pressure sensor 102 is indicative of driver demand. The sensor may also be located externally of the ECU as shown at 102a.

The purpose of this driver control pressure sensor 102 is to guarantee that the driver has always priority. In a roll stability control event the system 10 will switch back to a pneumatically and driver controlled braking (instead of electrically controlled braking) if the driver control pressure 22 (as measured by driver demand) reaches a higher value than the pressure called for by the ECU 100.

The driver demand sensor 102 as connected to the driver operated control pressure 22 allows the driver to take over if his pressure is greater than the delivery pressure of one or both of the pilot valve controlled relay valves 24 and 40. Alternatively, a stoplight switch could be used instead, either hard wired or via the ECU's knowledge as provided by a data link between the ABS ECU and the engine. In addition, suitable software is implemented in the ABS-ECU to provide the capability of electrically initiating braking.

Another one of the additional sensors that is used for the roll stability control function is a lateral acceleration sensor 104. The lateral acceleration sensor 104 senses lateral acceleration of the vehicle, which is a factor that can be used in determining the imminence of a rollover event. The lateral acceleration sensor can also be provided externally of the ECU 100 as shown at 104a.

A third one of the additional sensors is an air suspension pressure sensor 106. This sensor 106 measures the pressure in the vehicle's air suspension 108. The output of the air suspension pressure sensor 106 is indicative of load on the suspension, from which can be derived the height of the vehicle center of gravity. This is a factor that can be used in determining the imminence of a rollover event. The air suspension pressure senor can also be provided externally of the ECU 100 as shown at 106a.

The operation of the relay valves 24 and 40, to provide the roll stability control function, is controlled by the ECU 100. In accordance with the present invention, the appropriate action is the providing of a low-pressure test pulse (for example, 12–14 psi), for a brief period of time (for example less than 2 seconds), at the brake chamber of the inside (in a curve) road wheel. This tests to see how heavily or lightly loaded is the inside wheel, which is indicative of the roll stability of the vehicle. That is, if the inside wheel locks up with just this low pressure applied to its brake, then it must be very lightly loaded and the vehicle must be approaching a roll stability limit, for which electrically initiated braking of the curve outside wheels should be effected.

Figure 5:
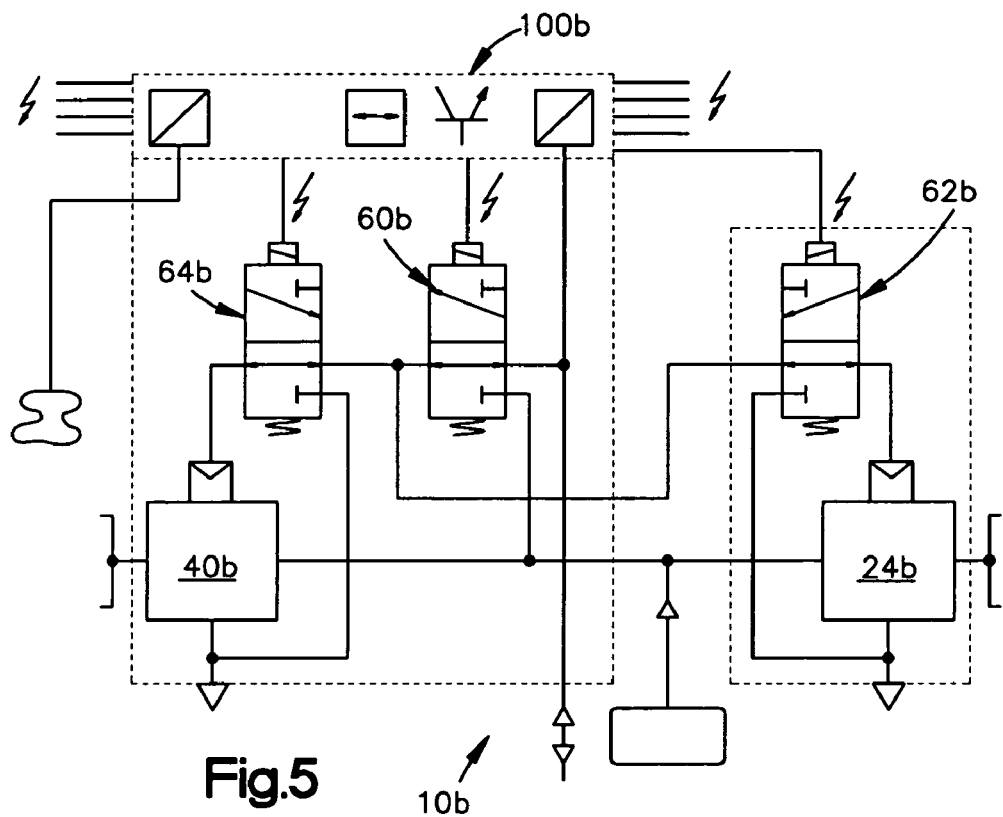
FIG. 5 is a schematic illustration of a system similar to FIG. 1 but constructed in accordance with a third embodiment of the invention.

The concept of providing such a test pulse for this purpose is known in the art, for example as shown in FIG. 5 of U.S. Pat. No. 6,553,284. However, in the prior art, this small pressure at the brake chamber has to be measured, in order to limit the pressure. This requires a pressure sensor at each brake chamber that is to be controlled. For a trailer, that means at least two additional sensors, with associated wiring and control software. As described below, in accordance with one feature of the present invention, no such measurement is needed herein. This simplifies significantly the hardware needed to perform the RSC function.

Figure 2:
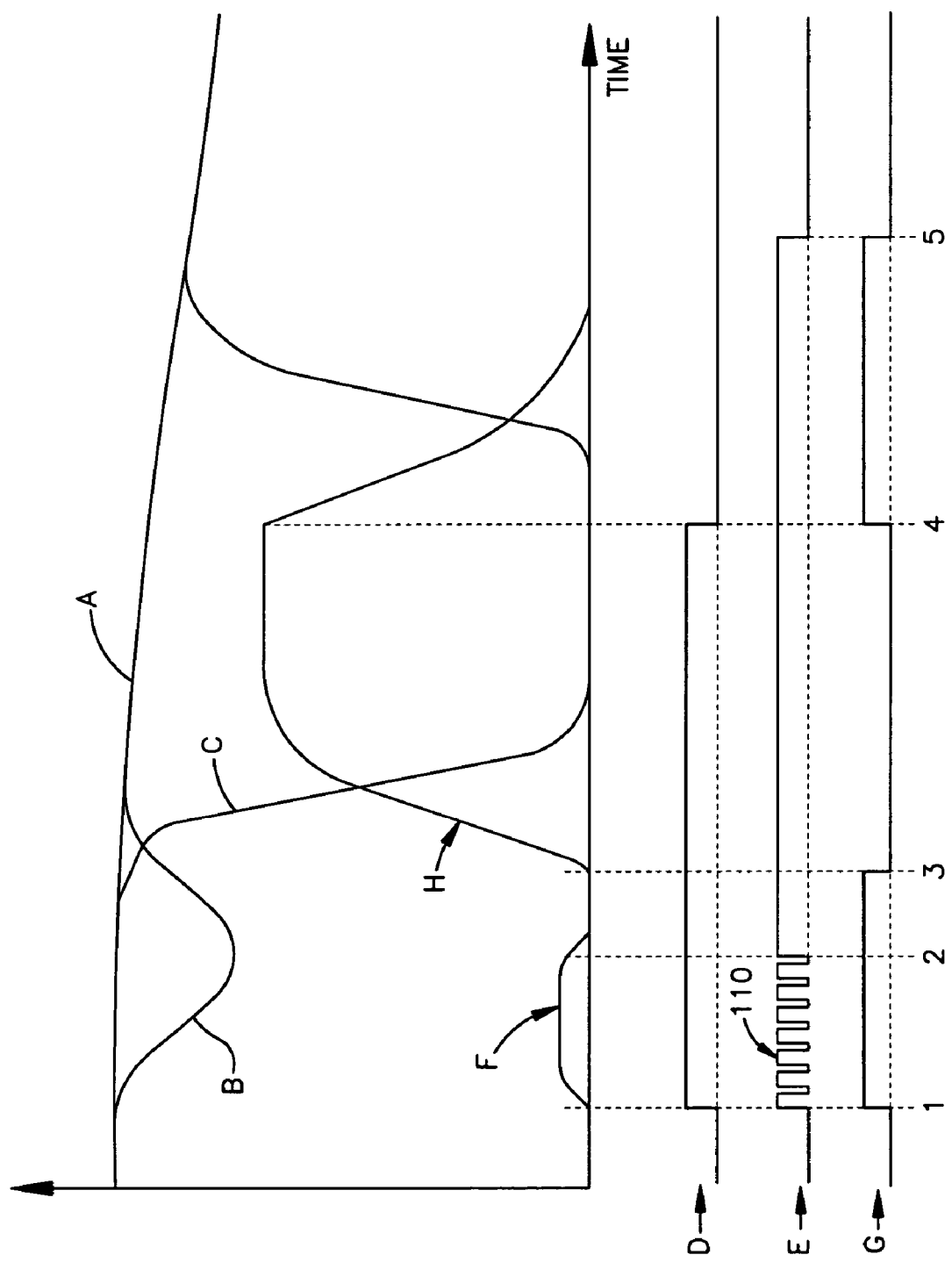
FIG. 2 shows a graph showing solenoid actuations, brake pressures, and resulting wheel speed changes in an exemplary ongoing roll stability control event for a trailer using the system of FIG. 1.

FIG. 2 herein is a representative schematic diagram illustrating the use of such a test pulse in braking a vehicle. The graph in FIG. 2 shows schematically an ongoing roll stability control event with the characteristic brake pressure behavior, the actuations of the solenoids shown in the system of FIG. 1, and the corresponding wheel speeds (as compared to vehicle speed).

Line A represents the vehicle speed over the course of the event. Line B represents the wheel speed of the inside wheel over the course of the event. Line C represents the wheel speed of the outside wheel over the course of the event. As can be seen, all three lines A, B and C start out at the same speed, with some variations over time as the braking system is used to enhance roll stability of the vehicle.

Line D represents the time of actuation (on/off) of the solenoid 76 on the supply pressure valve 60. Where the line D is up, the solenoid 76 is energized, and supply air 20 is provided to the pilot valves 62 and 64. Where the line D is down, the solenoid 76 is not energized, and driver control pressure 22 is provided to the pilot valves 62 and 64.

Line E represents the time of actuation (on/off) of the solenoid 86 on the pilot valve 62 for the relay valve 24 associated with the inside wheel. Where the line E is up, the solenoid 86 is energized and the pilot valve 62 is in the release or exhaust condition, with zero air pressure being provided to the control port 34 of the relay valve 24 and no braking effect at the inside wheel. Where the line E is down, the solenoid 86 is not energized, and driver control pressure 22 or supply air pressure 20 is provided to the control port 34 of the relay valve 24, allowing braking effect to be provided at the inside wheel. Line F represents the applied braking pressure at the inside wheel.

Line G represents the time of actuation (on/off) of the solenoid 94 on the pilot valve 64 for the relay valve associated 40 with the outside wheel. Where the line G is up, the solenoid 94 is energized and the pilot valve 64 is in the release or exhaust condition, with zero air pressure being provided to the control port 54 of the relay valve 40 and no braking effect at the outside wheel. Where the line G is down, the solenoid 94 is not energized, and driver control pressure 22 or supply air pressure 20 is provided to the control port 54 of the relay valve 40, allowing braking effect to be provided at the outside wheel. Line H represents the applied braking pressure at the outside wheel.

During the exemplary event that is shown in FIG. 2, the ECU 100 compares the actual measured lateral deceleration in relation to the actual wheel speed, which, in a non-braking situation, is the same as the actual vehicle speed A. Also considered are the vehicle weight and the height of the center of gravity, which as discussed above are calculated by considering vehicle data and with the measured pressure of the air suspension (the air suspension pressure is proportional to the vehicle weight).

When the ECU 100 detects the possibility of a critical over-speed curve driving situation, the test pulse of 12–14 psi is provided at the inside wheel. The duration of the pulse may be in the range of from about one second to about two seconds. In FIG. 2, this pulse lasts between the time points labeled 1 and 2. The pulse is provided by energizing the supply pressure solenoid 76, which directs supply air to the pilot valve 62.

In accordance with the present invention, in order to provide the test pulse, the solenoid 86 on the pilot valve 62 associated with the inside wheel is rapidly cycled, as illustrated by the square wave configuration at 110. This rapid cycling, the way it is achieved, and its consequent generation of the low pressure pulse, are described below in detail as one feature of the invention.

At the same time, the solenoid 94 on the pilot valve 64 associated with the outside wheel is energized. This causes the relay valve 40 associated with the outside wheel to be connected with exhaust 48 through that pilot valve 64, ensuring that no braking pressure is applied at the outside wheel.

As a result of these actions, a small amount of braking force is applied to the inside wheel, as shown by the line F, under the control of the ECU 100, with no braking force being applied at the outside wheel. If, as a result, there is a decrease in the speed of the inside wheel (as shown by the line B), this indicates that the curve inside wheel is very lightly loaded and thus nearly ready to lift up off the ground. From this it is inferred that the vehicle is close to a roll stability limit and needs to be slowed down. The test pulse 110 is ended at time point 2, and the solenoid 86 on the pilot valve 62 that is associated with the inside wheel is shifted to a constantly energized condition for the period between the time points 2 and 3.

At time point 3 in the event, the outside wheel solenoid 94 (line G) is de-energized so that braking pressure is applied to the outside wheel as shown by the line H. This is because the ECU 100, as noted above, has determined that (in this example) the vehicle needs to be slowed because it is approaching its roll stability limit. The curve H, which represents brake pressure at the outside wheel, increases in height along the Y axis of FIG. 2, indicating increasing braking force as the system 10 applies additional pressure to the brake associated with the outside wheel. As a result, the outside wheel speed (line C) decreases in response to the applied braking force. With full pressure being applied to the curve outside wheel (which is relatively heavily loaded), the vehicle slows down and returns to a safe and stable condition. The inside solenoid (line E) remains energized and so no braking pressure is applied to the inside wheel, during this period from point 3 to point 4.

At point 4 the outside solenoid 94 is energized again, and braking pressure to the outside wheel ceases. It should be noted that during this entire process, there is no measurement of the pressure at the brake chamber 14 of the wheel being tested. The desired low pressure test pulse is delivered to the chamber 14, in a manner as described below, without actually measuring the pressure at the brake chamber. This eliminates the need for a sensor for this purpose, and thus provides a significant advantage as compared to a typical EBS system, which includes such a sensor for that very purpose.

To provide the test pulse 110 shown in FIG. 2 requires hardware that is operative selectively to (a) increase the pressure at the brake chamber 14; to (b) hold the pressure at the brake chamber substantially constant; and to (c) decrease the pressure at the brake chamber. This hardware has to be able to cycle between these three conditions rapidly.

In the prior art, the known hardware that is operative in this manner is relatively complex and costly, significantly more so than the hardware that is shown in FIG. 1. Typical prior art EBS hardware for achieving this function is shown schematically in FIG. 9.

In accordance with the present invention, different hardware, which is less complex and less expensive, is used to provide the test pulse. This hardware is the relatively simple ABS hardware, with sensors, that is shown and described above with respect to FIG. 1.

With this ABS hardware, increasing the pressure at the brake chamber 14 is accomplished by, as described above, energizing the solenoid 86 on the pilot valve 62 and thereby applying supply air 20 to the control port 34 of the relay valve 24. With this ABS hardware, decreasing the pressure at the brake chamber 14 is accomplished by, as described above, de-energizing the solenoid 86 on the pilot valve 62 and thereby venting the brake chamber 14 to exhaust 28 through the relay valve 24.

With this ABS hardware, holding the pressure constant at the brake chamber 14 (for example, to provide the two second duration 8–10 psi test pulse of FIG. 2) is slightly more complex. It may not easily be seen how this can be accomplished with only the single solenoid controlled pilot valve 62 and the relay valve 24. Nevertheless, this is an important function for rollover control stability, and in accordance with the invention, is provided in the following manner.

Figure 9:
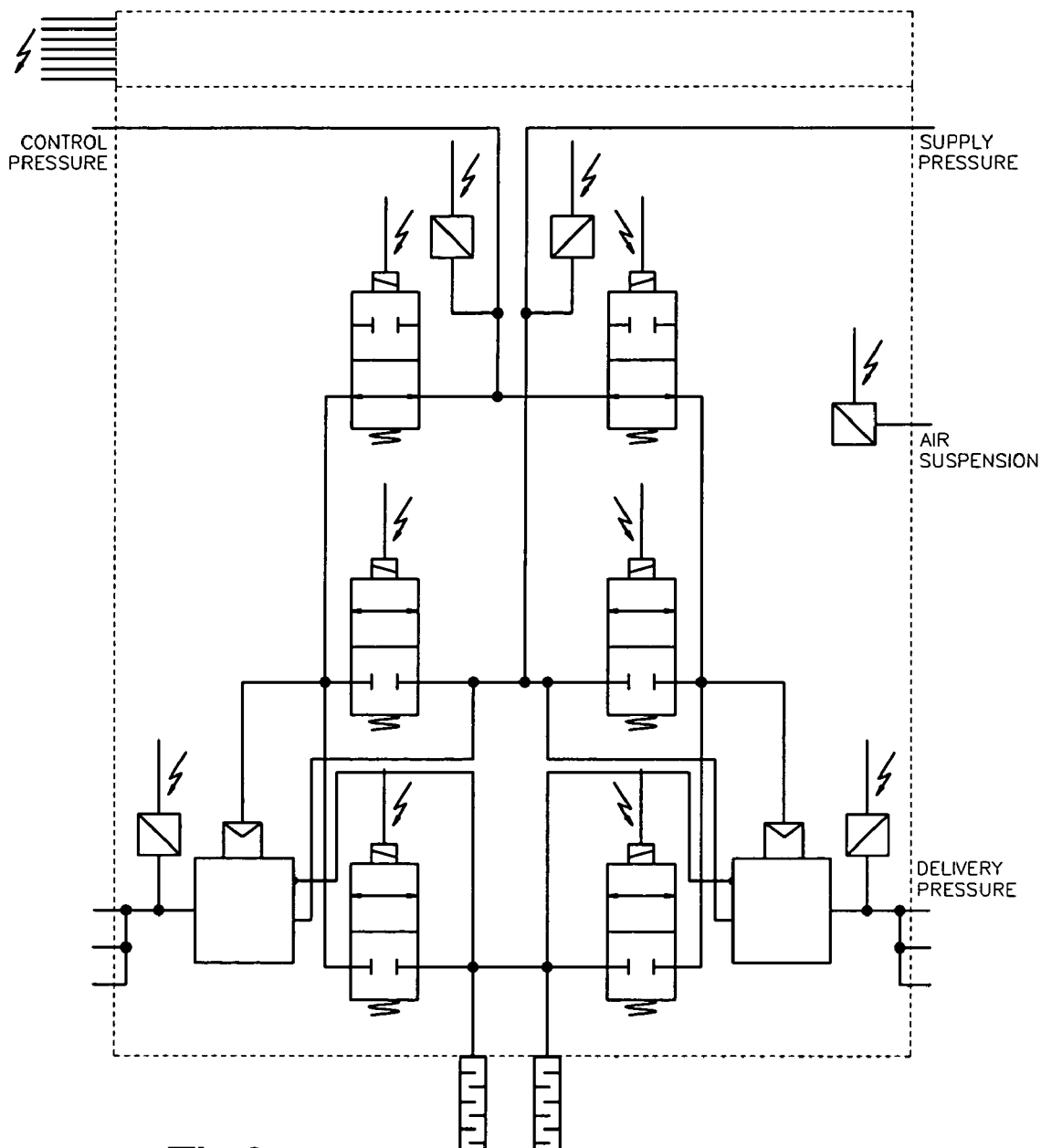
FIG. 9 is a schematic illustration of a prior art EBS-based roll stability control system.

The controlled operation of the relay valve 24, to achieve the needed hold function, is provided by a special control mode. This special control mode is described in U.S. Pat. No. 6,371,573. Briefly, with this special control mode, provided from the ECU 100, the pressure is controlled in each relay valve 24 and 40 independently, including the functions of pressure release, pressure hold and pressure build up. This three-point pressure behavior in two independent valve channels 12 and 16 is normally achievable only when 4 solenoids are used (separate hold and release solenoids for each of the two channels), for example, as shown in FIG. 9. With the present invention, the special control mode is able to achieve a pressure hold while using only one 3/2 solenoid 62, 64 on each relay valve 24, 40 respectively.

The pressure builds up if the single solenoids 62, 64 are not energized and the pressure releases when the solenoids are energized. The pressure-hold phase is achieved by controlling the relay valve single 3/2-solenoid 86 with short (temporally) release and build up phases at a high frequency—pulsing the valve 62, in effect. By varying the duty cycles of the energizing and de-energizing phases (that is, by varying the time spent energized and de-energized), the rate of pressure build up or release can be changed from fast to slow, or can be maintained at a level to hold the pressure constant (neither building up nor releasing).

This special control mode takes advantage of the existence of hysteresis in the movement of the relay valve 24 piston and its relatively slow response—that is, response that is slower than the changes to the control pressure that is applied to the control port 34 of the relay valve. The control volume pressure (on top of the piston of the relay valve 24) can be pulse-width-modulated between exhaust and build modes of operation (i.e. without any hold state) without having any significant pressure variation appear in the pressure at the brake chamber 14—thus effectively achieving a "hold" state at the brake chamber 14.

In sum, in this control method, varying the duty cycle regulates the average pressure on top of the piston of the relay valve 24. The pressure in the brake chamber 14 settles at the same average control pressure without any overshot. The high frequency pressure oscillations that exist in the air supplied to the relay valve control port 34 are not translated into chamber pressure oscillation, because of the slow response of the relay valve. This is the control method that is used to achieve the relatively constant low pressure test pulse shown in FIG. 2, which is used for roll stability control.

Further, the pressure at the brake chamber 14 need not be measured—rather, it can be inferred. This eliminates the need for a pressure sensor at the wheel (at the brake chamber 14).

On the basis of the readings of the sensors 102, 104 and 106, the ECU 100 determines whether a rollover event may be imminent. If so, then the ECU 100 energizes the solenoid 76 on the supply pressure valve 60. A low pressure test pulse is applied to the brake chamber 14, as described immediately above.

When the solenoid 76 on the supply pressure valve 60 is energized, the passage in the supply pressure valve for the driver control pressure 22 is moved to a closed position (as shown in the upper part of the supply pressure valve). As a result, the control air that is supplied to the control ports 34 and 54 of the relay valves 24 and 40, respectively, comes from the supply air source 20, rather than from the driver control pressure source 22.

Operation of the first channel 12 in this type of braking is the same as operation of the second channel 16, and so only the operation of the first channel is described. The supply air source 20 is at a constant high pressure of 100 to 125 psi as supplied by the system reservoir. Therefore, when the first pilot valve 62 is in the open position as shown in FIG. 1 and the supply pressure valve 60 is energized, high pressure air is directed to the control port 34 of the first relay valve 24. The first relay valve 24 assumes a condition in which the delivery pressure to the first channel brake chamber 14 increases and braking effect is provided at the road wheel that is associated with the brake chamber.

If, on the other hand, the first pilot valve 62 is in the closed position (as shown in the upper part of the first pilot valve) when the supply pressure valve 60 is energized, high pressure air is not directed to the control port 34 of the first relay valve 24. Rather, the pressure at the control port 34 of the first relay valve 24 is released to the exhaust 28, and the first relay valve also assumes an exhaust condition, or release condition, in which the delivery pressure to the first channel brake chamber 14 is decreased and braking effect is let off at the road wheel that is associated with the brake chamber.

In accordance with the teachings of the above-mentioned U.S. Pat. No. 6,371,573, the first pilot valve 62 is cycled (pulsed) between these open and closed positions—to provide a hold position at the first channel brake chamber 14 as needed for the low pressure test pulse. The characteristics of this cycling—that is, frequency, and duration of energized and de-energized times—are achieved by exploiting the function shown in FIG. 3 herein, in accordance with a feature of the invention.

Figure 3:
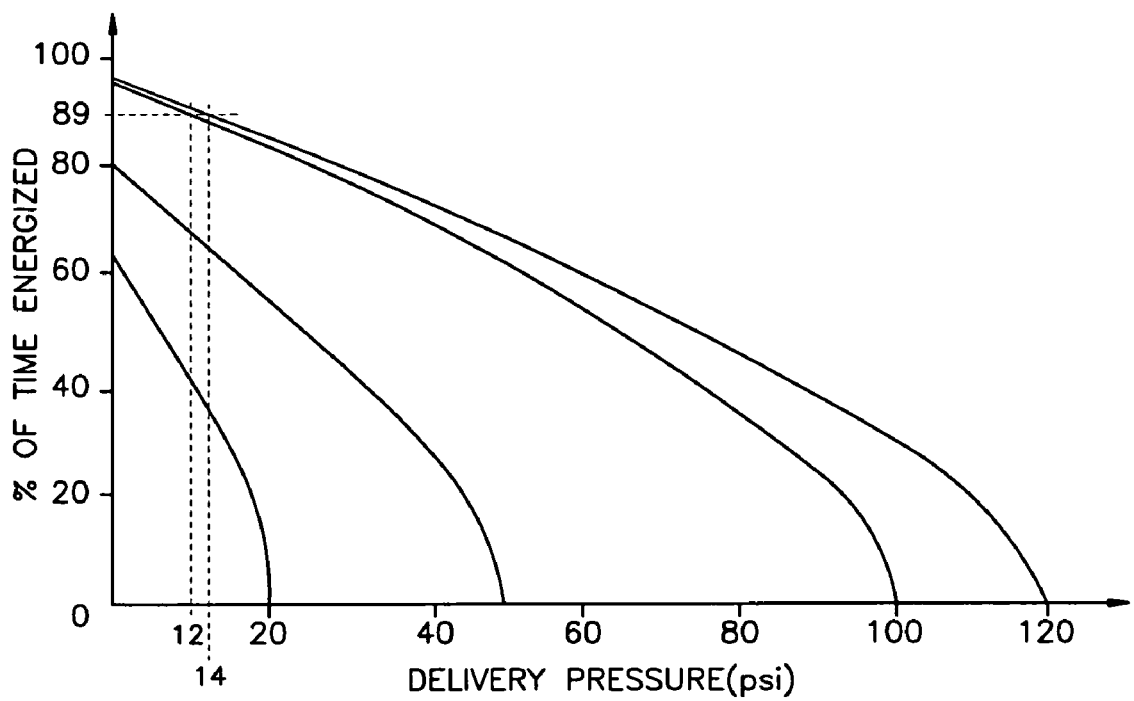
FIG. 3 shows a graph correlating the percent of duty cycles to the delivery pressure with a given control pressure.

The graph in FIG. 3 shows the delivery pressure that is achieved when the relay valve's control solenoid 86 (on the pilot valve 62) is controlled in the special control mode described above, for a given supply pressure.

The horizontal axis in FIG. 3 is pressure as delivered from the outlet (delivery) port of the relay valve 30 to the brake chamber 40. While the control pressure in an ABS event is variable and depends on the drivers demand, in an ongoing roll stability control event the control pressure supplied to the control port 34 of the relay valve 24 is taken from the vehicle supply pressure 20. This supply pressure 20 is typically 120 to 125 psi, but can drop during braking to approximately 100 psi.

The vertical axis shows the percentage of time that the solenoid 62 is energized. When the solenoid 62 is energized, the pressure to the control port 34 of the relay valve 24 decreases. When the solenoid 62 is de-energized, full pressure from the tank 20 is provided (built up). It can be seen that, the more the solenoid 62 is energized (releasing), the lower the resulting delivery pressure at 30 for any given supply pressure 20.

As shown in the graph, when the supply pressure is in the range of from about 100 psi to about 120 psi, a desired low pressure in the range of 12–14 psi can be delivered from the relay valve 24, with an accuracy of 2 psi, by energizing the single solenoid 86 of the associated pilot valve 62 at a duty cycle ratio of 89%. Thus, 89% of the time pressure is being released, and only 11% of the time is pressure being built up. This results, taking into effect the hysteresis of the relay valve 24 as described above, in the provision of the desired 12 to 14 psi delivery pressure from the relay valve. Other times, percentages, pressures, etc. are possible.

In sum, if the supply air pressure 20 is known, then controlling the single solenoid 86 of the pilot valve 62 to provide a particular percentage of duty cycle, can provide a desired delivery pressure at 30 from the relay valve 24. The frequency of switching on and off the single solenoid 86 is constant; only the length (percentage) of the energized phase to the length of the de-energizing phase is varied. The required values are stored in the ECU 100 so that, once a determination of supply pressure is made, the ECU can immediately control the solenoid valves 62 and 64 as needed to provide the desired low pressure test pulse in the manner described above.

The supply air pressure 20 is known (pressured) to beat 100–125 psi, because it is governed. A governor (not shown), associated with the system compressor, controls when the compressor will pump air into the air storage tank 20 of the system. When the pressure in the tank 20 rises to the "cut-out" level (around 125 pounds per square inch or "psi"), the governor stops the compressor from pumping air. When the tank pressure falls to the cut-in pressure (around 100 psi), the governor allows the compressor to start pumping again.

Within this relatively small range of 100 psi to 125 psi, the calculation of FIG. 3 can always guarantee a low pressure test pulse in the range of 12–14 psi. This desired low pressure test pulse is provided with sufficient accuracy without the need of measuring. This eliminates the need for pressure sensors at the wheel ends (brake chambers 14 and 18), which is the elimination of a significant expense and complexity.

One goal of the present invention is to provide a roll stability control system using simpler hardware. This goal is achieved in the present invention as discussed above. Prior art systems require pressure sensors at the wheel end, for controlling the ECU to provide the low pressure test pulse. No pressure sensors are needed at the wheel ends with the present invention. Instead, the desired low pressure is achieved by calculating, using the concepts shown graphically in FIG. 3. Knowing the model of FIG. 3, one can achieve the low pressure pulse of FIG. 2 with the ABS hardware and additional sensors shown in FIG. 1, without actually having to sense the pressure at the wheel end. One can know one if one is applying the desired low delivery pressure, without measuring it.

In addition, the prior art system would require at least two solenoid-controlled valves for each channel, to achieve the build-hold-release results at the relay valve for that channel. With the present invention, in contrast, only one solenoid controlled valve is needed for each channel. That one valve is modulated in accordance with the special control mode described above, to achieve the hold mode.

Thus, for the same roll stability control circumstances, an EBS based RSC arrangement needs up to 6 solenoids and 5-pressure sensors, while the ABS based arrangement as described in the present invention need only 3 solenoids and one pressure sensor. This reduced number of solenoids has additional advantages in requiring simpler ECU hardware and software, fewer electrical and pneumatic connections, and a more compact unit design.

In addition, the prior art EBS system achieves the roll stability control function with hardware that is in constant use (solenoids and valves actuated with every service brake application) and that therefore must be heavier and more robust than standard braking components. ABS/ATC hardware, in this case the supply pressure valve with solenoid, and the pilot valves with solenoids, is rarely used and therefore need not be so robust and therefore can be less expensive and smaller in size. Thus, the present invention eliminates the need to use heavy and expensive devices just to achieve the added function of Roll stability control on top of ABS/ATC. There are (and are expected to be for a long time to come) many applications in which EBS is not desired but RSC is desired. The present invention addresses those needs and those vehicles.

Thus, using the relatively simple ABS hardware plus sensors of FIG. 1, to achieve the roll stability control function shown in FIG. 2, is one feature of the invention. Another feature is the implementation of the model of FIG. 3 with the hardware of FIG. 1. The model of FIG. 3 assumes no pressure measurement, and the ABS/ATC hardware shown in FIG. 1 has no wheel end pressure sensors. Using the model of FIG. 3 with this hardware makes them unnecessary, and so one can use the simpler hardware of FIG. 1.

Another feature of the invention is using the model of FIG. 3 to achieve the low pressure test pulse of FIG. 2, without measuring. This model has previously been used only in conjunction with the more complex EBS hardware. This feature involves selecting the pressure that is desired (for example, the 12–14 psi at the brake chamber) and obtaining and holding it by calculating how long the solenoid should be energized and how long it should be de-energized. More generally, using the model of FIG. 3 to achieve a desired pressure at the brake chamber, without measuring, is another feature of the invention.

The roll-stability-control component arrangement as shown in FIGS. 1–3 is primarily intended for use in an air braked trailer. But a similar arrangement could be used also for roll stability control in a powered vehicle, such as a truck or a tractor. In that case, the pressure sensor which is connected to the air suspension would not be necessary, because the engine ECU provides data such as engine torque via J1939 to the other vehicle installed electronic systems. This data can be used by the ABS-ECU for calculating the mass of the vehicle and for estimating the height of the center of gravity.

The pressure sensor 102 that is connected to the control pressure side, to sense the drivers braking demand, can be eliminated if a pressure switch or the brake light switch signal is used. This signal information is available in a powered vehicle over the J1939 bus and/or via hardwire connection. In case of use in a trailer, the ABS-ECU already receives this stop light information via hardwire over the J560 electrical tractor/trailer connection. The driver's priority can be guaranteed with the use of the pressure sensor or the stop light switch information. Thus, if the driver starts braking during an ongoing roll stability control event, the system will stop the roll stability control and switch back to normal braking with ABS control only. In case of use of a pressure sensor the system will switch back only if the drivers demand is higher as the current delivery pressure.

FIGS. 4–8 illustrate other embodiments of the invention that are all used to achieve the result of FIG. 2, with hardware that is somewhat different from (a variation of) the hardware of FIG. 1. The underlying concepts are similar.

Figure 4:
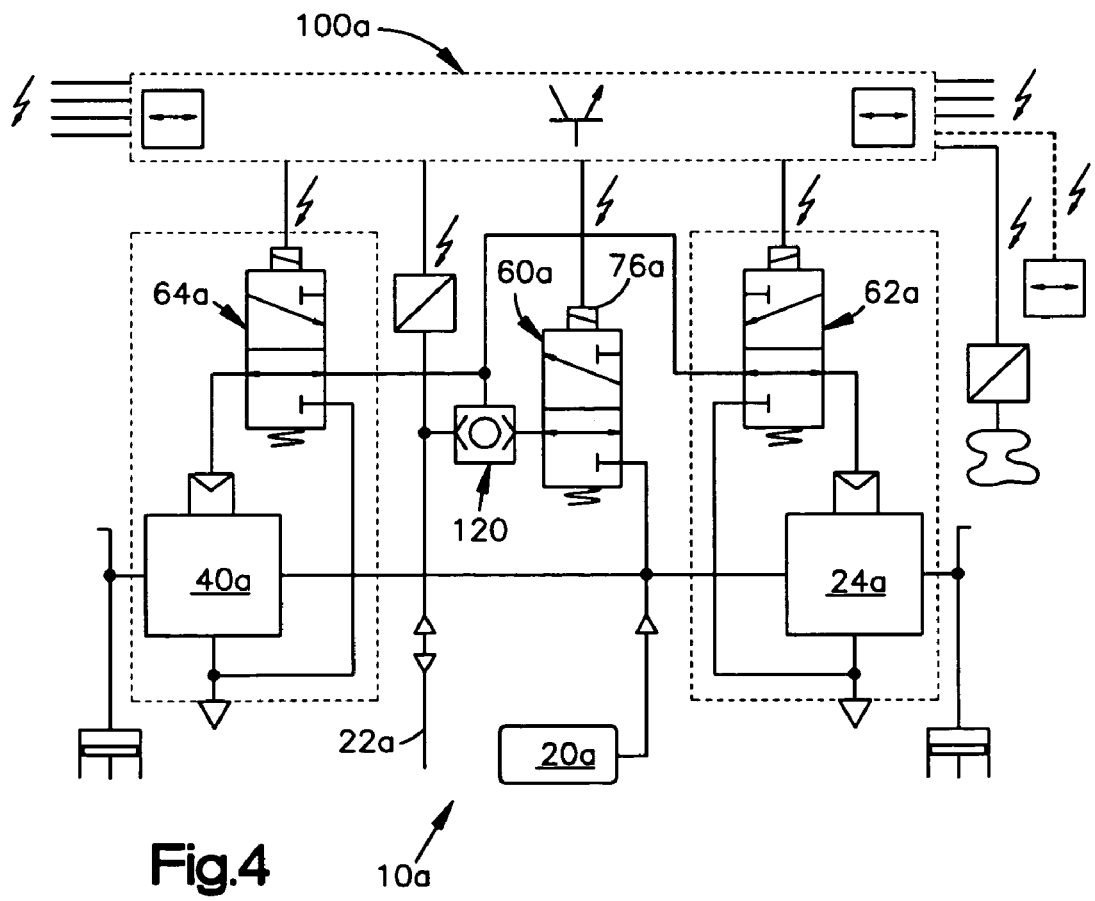
FIG. 4 is a schematic illustration of a system similar to FIG. 1 but constructed in accordance with a second embodiment of the invention.

FIG. 4 shows schematically an RSC-component system 10*a* similar to the system 10 shown in FIG. 1 with the exception that a 2-way check valve 120 is included for use with the supply pressure valve 60*a* and its solenoid 76*a*. The function of this system 10*a* is the same as that of the system 10 described in FIG. 1, with the exception that in the case of pneumatically operated braking, the control pressure that is supplied to the pilot valves 62*a* and 64*a* is not controlled solely by the supply pressure solenoid. The check valve 120 operates by the select high principle, that is, always the higher pressure goes through. As a result, when the solenoid 76*a* on the supply pressure valve 60*a* is not energized, the higher of (a) driver demand pressure and (b) supply air pressure, is provided to the pilot valves.

In the system 10*b* that is shown in FIG. 5, the 3/2-solenoid controlled valve 60*b* for selecting control or supply pressure is integrated with one of the two relay valve arrangements, specifically, the relay valve 40*b* and its pilot valve 64*b*. The ECU 100*b* is part of this arrangement, also. In this case the second relay valve arrangement consists only of the single-solenoid controlled relay valve 24*b* and pilot valve 62*b* as designed and used for normal ABS control. The advantage here is that only one relay valve arrangement needs to be specially designed for the RSC function.

Figure 6:
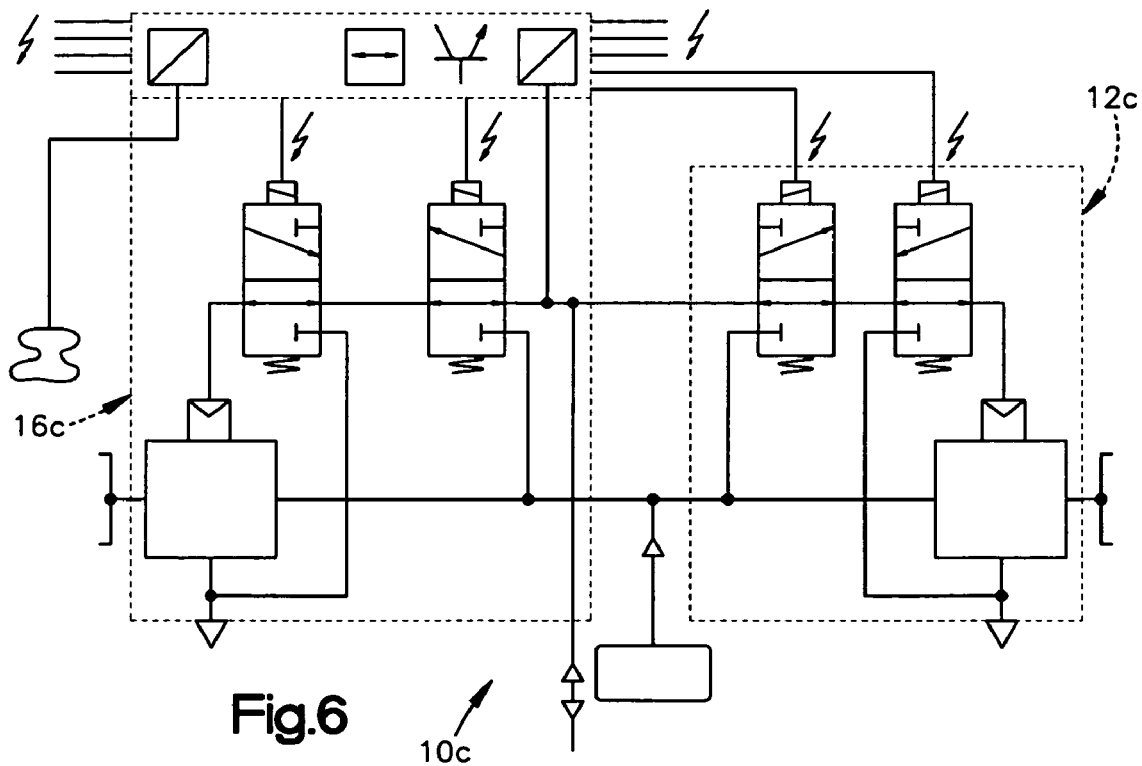
FIG. 6 is a schematic illustration of a system similar to FIG. 1 but constructed in accordance with a fourth embodiment of the invention.

In the system 10*c* shown in FIG. 6, two individually electrically actuatable braking channels 12*c* and 16*c* are provided. Each of the two relay valve arrangements has its own 3/2-solenoid for the selection of pneumatically or electrically operated braking. As a result, each channel 12*c* and 16*c* can be electrically braked individually. The ECU 100*c* can be attached to one of these two relay valve arrangements, as shown in FIG. 6, or can be mounted separately.

Figure 7:
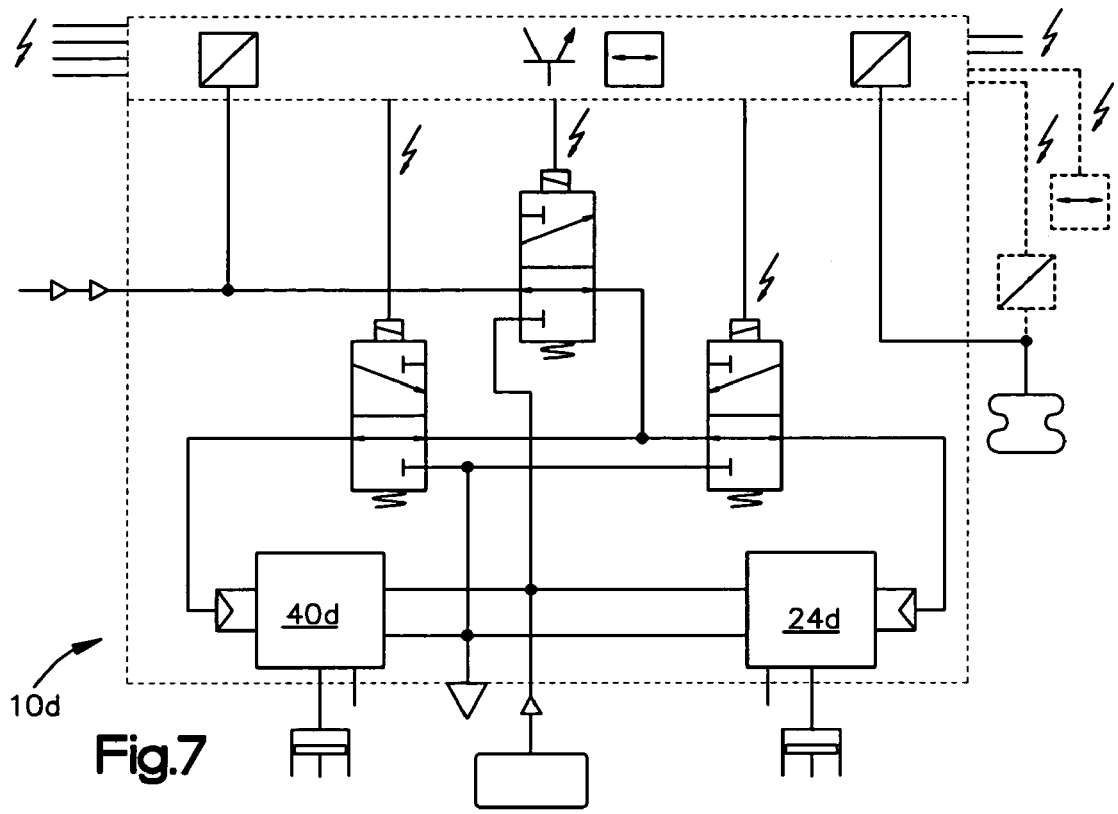
FIG. 7 is a schematic illustration of a system similar to FIG. 1 but constructed in accordance with a fifth embodiment of the invention.

FIG. 7 shows a system 10*d* having the most compact and effective RSC component arrangement. All necessary valves, solenoids and sensors for RSC are built together as one unit. For more compactness the axles of the two relay valves 24*d* and 40*d* are horizontal and co-axial. This orientation of the two relay valves 24*d* and 40*d* allows venting of released pressure to only one combined exhaust.

Figure 8:
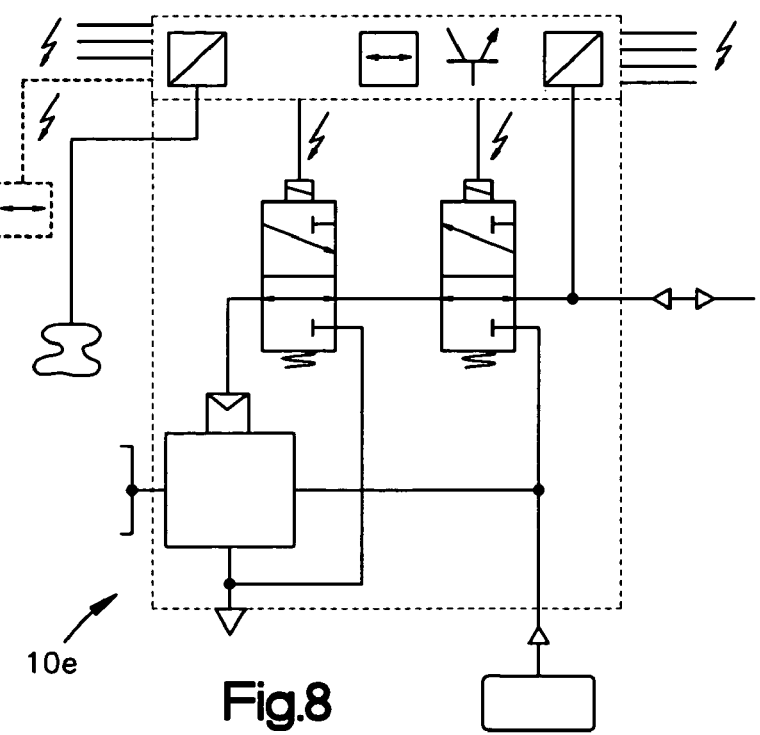
FIG. 8 is a schematic illustration of a system similar to FIG. 1 but constructed in accordance with a sixth embodiment of the invention.

FIG. 8 shows a simplified system 10*e* using a single relay modulator that controls all of the brakes on one trailer axle with only two 3/2-solenoids. This arrangement has the advantage of further reducing electrical complexity, with some penalty in vehicle performance and driver comfort. In this case the test pulse described in FIG. 2 is applied to both the inside and the outside wheels. If the inside wheel indicates unloading by exhibiting considerable slip as compared to the outside wheel, RSC intervention is pursued. During the RSC intervention pressure is applied equally to both the inside wheels and the outside wheels. In this case the inside wheels which are more lightly loaded or possibly off the ground might lock. Tire wear may be evident on the inside wheels if they lock completely with significant load. The reduced system complexity and reduced cost may justify the potential for driver discomfort and tire wear. During this phase of operation, the vehicle driver might also detect the trailer test pulse more readily than with the other systems 10–10*d* shown above, which have two independent pressure channels.

The foregoing description is only exemplary of specific embodiments of the invention. Improvements, changes, and modifications to the invention are intended to be included within the scope of the appended claims.

The invention claimed is:

1. A vehicle braking system for providing roll stability control, comprising:
   a brake chamber associated with a vehicle wheel to be braked;
   an air-pressure controlled relay valve for providing air pressure to the brake chamber;
   a solenoid controlled pilot valve for controlling flow of control air to the relay valve;
   a solenoid-controlled supply pressure valve operative to direct either supply pressure or driver control pressure to the pilot valve as control air for the relay valve;
   an ECU operative to control the solenoids on the supply pressure valve and the pilot valve; and
   sensors for sensing vehicle conditions that are used in a determination of whether to initiate roll stability control.

2. A system as set forth in claim 1 wherein said sensors include a lateral acceleration sensor and an air suspension pressure sensor.

3. A system as set forth in claim 1 wherein said ECU is operative to control the solenoids on the supply pressure valve and the pilot valve to cause the relay valve to provide a low pressure test pulse to the wheel to be braked.

4. A system as set forth in claim 3 wherein said ECU is operative to cause the low pressure test pulse to be provided without the use of a measurement of delivery pressure at the wheel to be braked.

5. A system as set forth in claim 1 wherein said ECU energizes and de-energizes said pilot valve solenoid at a rate that is rapid enough to take advantage of the hysteresis of said relay valve thereby to place said relay valve in a hold condition.

6. A system as set forth in claim 1 wherein said ECU controls the solenoid on the supply pressure valve to direct supply pressure to the pilot valve on the basis of readings from said sensors that are indicative of a vehicle condition for which roll stability control may be desired, and said ECU controls the solenoid on the pilot valve to pulse rapidly the control air to the relay valve.

7. A system as set forth in claim 6 wherein said ECU controls the time of energization and de-energization of the pilot valve, in order to pulse the control air to the relay valve, on the basis of a calculation rather than on the basis of measurement of the delivery pressure from the relay valve.

8. A system as set forth in claim 7 wherein said calculation is based on the pressure of the supply air at said pilot valve and a determination of the time of energization and de-energization of the pilot valve needed to provide the desired delivery pressure for any given supply air pressure.

9. A system as set forth in claim 8 wherein said pilot valve solenoid is energized and de-energized at a rate that is rapid enough to take advantage of the hysteresis of the relay valve thereby to place the relay valve in a hold condition.

10. An apparatus as set forth in claim 1 further including a two way check valve connected with said supply pressure valve and operative to pass the higher of (a) driver demand pressure and (b) supply air pressure to said pilot valve.

11. An apparatus as set forth in claim 1 wherein said supply pressure valve and said pilot valve and said relay valve are integrated into one assembly.

12. An apparatus as set forth in claim 11 wherein said ECU is integrated into said one assembly with said supply pressure valve and said pilot valve and said relay valve.

13. An apparatus as set forth in claim 1 wherein said brake chamber and said relay valve and said pilot valve and said supply pressure valve together are part of a first braking channel of the vehicle;
said apparatus further comprising a second braking channel including a second brake chamber, a second relay valve, a second pilot valve, and a second supply pressure valve;
said second braking channel being independent of said first braking channel so that each channel can be electrically braked individually.

14. An apparatus as set forth in claim 13 wherein said ECU is integrated with one of said relay valves of said first and second braking channels.

15. An apparatus as set forth in claim 1 wherein said supply pressure valve and said pilot valve and said relay valve are integrated into one assembly, said apparatus further comprising a second relay valve and a second pilot valve for controlling a second brake chamber and also integrated into said one assembly.

16. An apparatus as set forth in claim 15 wherein said ECU is integrated into said one assembly.

17. An apparatus as set forth in claim 1 wherein said relay valve controls all of the brakes on one axle of the vehicle.

18. A vehicle braking system for providing roll stability control, comprising:
a brake chamber associated with a vehicle wheel to be braked; an air-pressure controlled relay valve for providing air pressure to the brake chamber;
a solenoid controlled pilot valve for controlling flow of control air to the relay valve;
a solenoid-controlled supply pressure valve operative to direct either supply pressure or driver control pressure to the pilot valve as control air for the relay valve; and
an ECU operative to control the solenoids on the supply pressure valve and the pilot valve thereby to provide a selected delivery pressure to the brake chamber without measurement of delivery pressure to the brake chamber.

19. A system as set forth in claim 18 wherein said ECU is operative to calculate the time of energization and de-energization of the pilot valve, for a given supply pressure, to provide the selected delivery pressure to the brake chamber.

20. A system as set forth in claim 19 wherein said ECU energizes and de-energizes said pilot valve solenoid at a rate that is rapid enough to take advantage of the hysteresis of said relay valve thereby to place said relay valve in a hold condition.

21. A system as set forth in claim 19 wherein the calculated time of energization and de-energization of the pilot valve provides a desired control pressure to the relay valve, thereby to provide the selected delivery pressure to the brake chamber.

22. A system as set forth in claim 18 wherein said ECU is operative to control the solenoids of said pilot valve and said supply pressure valve to cause a low pressure test pulse to be provided to said brake chamber without the use of a measurement of pressure at said brake chamber.

23. An apparatus as set forth in claim 18 further including a two way check valve connected with said supply pressure valve and operative to pass the higher of (a) driver demand pressure and (b) supply air pressure to said pilot valve.

24. An apparatus as set forth in claim 18 wherein said supply pressure valve and said pilot valve and said relay valve are integrated into one assembly.

25. An apparatus as set forth in claim 24 wherein said ECU is integrated into said one assembly with said supply pressure valve and said pilot valve and said relay valve.

26. An apparatus as set forth in claim 18 wherein said brake chamber and said relay valve and said pilot valve and said supply pressure valve together are part of a first braking channel of the vehicle;
said apparatus further comprising a second braking channel including a second brake chamber, a second relay valve, a second pilot valve, and a second supply pressure valve;
said second braking channel being independent of said first braking channel so that each channel can be electrically braked individually.

27. An apparatus as set forth in claim 26 wherein said ECU is integrated with one of said relay valves of said first and second braking channels.

28. An apparatus as set forth in claim 18 wherein said supply pressure valve and said pilot valve and said relay valve are integrated into one assembly, said apparatus further comprising a second relay valve and a second pilot valve for controlling a second brake chamber and also integrated into said one assembly.

29. An apparatus as set forth in claim 28 wherein said ECU is integrated into said one assembly.

30. An apparatus as set forth in claim 18 wherein said relay valve controls all of the brakes on one axle of the vehicle.

31. A method of controlling vehicle roll stability by applying air pressure to a brake chamber associated with a vehicle wheel, comprising the steps of;
providing supply air at a known pressure to a first solenoid controlled valve that is associated with the brake chamber;
calculating the amount of time of energization and de-energization of the first valve that is needed to provide an output therefrom of a given pressure; and
energizing and de-energizing the first valve for the calculated times, thereby to cause a low-pressure test pulse to be provided to the brake chamber.

32. A method as set forth in claim 31 further including the step of directing the output of said first valve to a second valve as a control pressure for the second valve.

33. A method as set forth in claim 32 wherein the first valve is a 3/2 solenoid controlled valve and the second valve is a pilot air pressure controlled relay valve.

34. A method as set forth in claim 33 wherein said step of energizing and de-energizing the first valve includes energizing and de-energizing the first valve at a rate that is rapid enough to take advantage of the hysteresis of the second valve thereby to place the second valve in a hold condition.

35. A method as set forth in claim 33 wherein said step of providing supply air to a first solenoid controlled valve includes the step of controlling a third valve which is a 3/2 solenoid controlled valve having both supply air and driver demand air as inputs, the controlled output of the third valve being directed to the first solenoid controlled valve.

* * * * *